United States Patent [19]

Koch

[11] 3,945,743

[45] Mar. 23, 1976

[54] TUBE FASTENING-JOINT ASSEMBLY

[76] Inventor: Victor C. Koch, 1480 Roswell St., Smyrna, Ga. 30080

[22] Filed: Oct. 15, 1974

[21] Appl. No.: 514,511

[52] U.S. Cl. ............ 403/290; 312/257 SK; 312/263; 403/297; 52/760
[51] Int. Cl.² .................... F16B 12/36; A47B 47/00
[58] Field of Search ...... 52/760; 403/290, 295, 297, 403/356, 370, 374, 409; 16/39, 42 T; 312/111, 263–265

[56] References Cited
UNITED STATES PATENTS

| | | | |
|---|---|---|---|
| 2,840,402 | 6/1958 | Hassel | 403/374 X |
| 3,398,981 | 8/1968 | Vincens | 52/760 |
| 3,437,362 | 4/1969 | Offenbroich | 403/297 |
| 3,787,131 | 1/1974 | Reachek | 403/290 |
| 3,835,354 | 9/1974 | Pena | 312/263 |

Primary Examiner—Casmir A. Nunberg

[57] ABSTRACT

A joint for fastening a tubular member to another structural member with internally displaceable cooperating members that are releasably slidable relative to each other for frictionally engaging the internal surface of a tubular member for retaining it releasably to another structural member which may be readily assembled and disassembled.

9 Claims, 7 Drawing Figures

TUBE FASTENING-JOINT ASSEMBLY

BACKGROUND OF THE INVENTION

Most modern furniture is constructed of metal tubing whether round or square in cross-section. It is usually necessary to spot weld or provide some suitable permanent securing means to fasten the members together rigidly in order to support a load. Many articles of furniture may be prefabricated at the factory and the assembly costs eliminated substantially provided the various components may be readily assembled by the ultimate consumer without the necessity of costly tools and time-consuming operations. Simplicity of election for sturdy construction in modern metal furniture without welds that destroy the plating is highly desirable.

Various approaches have been made to accomplish a secure joint between a tubular member and another tubular or other type of structural member without the necessity of costly brackets, welding or other secure fastening means. Various types of telescopic locks, expansible couplings, keyway locks, and split washers, among other elements, have been attempted as illustrated in U.S. Pat. Nos. 2,383,273; 2,704,682; 2,840,402; 3,528,691; and 3,633,949, among other solutions, which eliminate welding. Most of the solutions have been costly, the parts difficult to fabricate by manufacture, difficult and complicated to install by the ultimate consumer, and most lack the required strength and rigidity.

It is an objective of this invention to provide a fastening joint for a tubular member, whether square, rectangular, or circular, in which a pair of slidably displaceable members may be inserted into a tubular member and by engagement with another structural member may be securely fastened together with a screwdriver or socket wrench by the ultimate consumer.

Another objective of the present invention is to provide a fastening joint that may be easily assembled and disassembled for knockdown structural metal furniture of various types in which a pair of concealed displaceable members frictionally engage the interior of a tubular member forming a releasable locking assembly.

Another objective of this invention is to provide a releasable locking assembly in which a pair of slidable members cooperate to engage the interior of a tubular member and frictionally retain the structural components together after assembly but the entire assembly may be disassembled readily without destroying the connecting members for further and repeated use.

BRIEF DESCRIPTION OF DRAWING

The invention for the fastening joint and assembly will be better understood from the following detailed description taken in conjunction with the accompanying drawing in which.

DETAILED DESCRIPTION OF THE INVENTION

Figure 1:
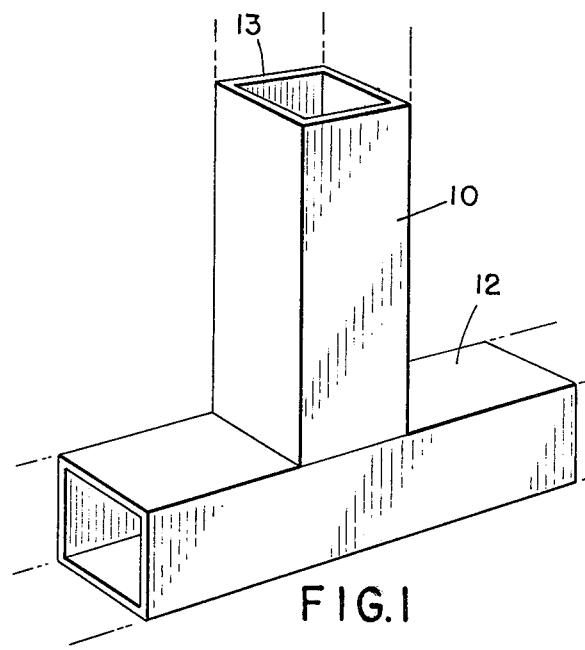
FIG. 1 is a perspective view of square tubular members being secured together without any exterior fastening means shown at the joint.
Figure 2:
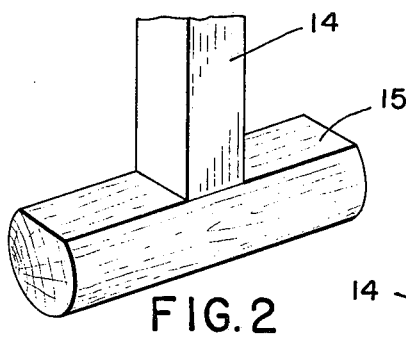
FIG. 2 is a perspective view of another connection of a tubular member with another structural member without any visible fastening means at the joint connection.
Figure 7:
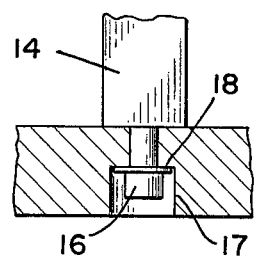
FIG. 7 is a reduced partial transverse sectional view of the fastening member at the lower end of FIG. 2.

Referring to the drawing and particularly to FIG. 1, there is illustrated a pair of tubular members 10 and 12 which have a square cross-sectional area in which the wall thickness 13 may vary depending upon the specific type of tubing used. Although the invention is disclosed in conjunction with square tubing or tubular members, it is applicable to rectangular as well as circular cross-sectional areas provided the joint fastening means is modified accordingly. The angle of the connection between the tubular members 10 and 12 is at a right angle but the invention is applicable to forming a fastening connection at angles other than the perpendicular between the connecting members. It will be observed that no welding or other visible connection is shown in FIG. 1. Also, in FIG. 2 no visible exterior connection is shown in the view and the vertical tubular member 14 is connected to a solid wood member 15. In FIG. 7, the fastening Allen-head bolt 16 is countersunk in the bore 17 and is provided with a washer 18 to retain the bolt in position with the fastening joint, to be described, contained within the tubular member 14.

Figure 5:
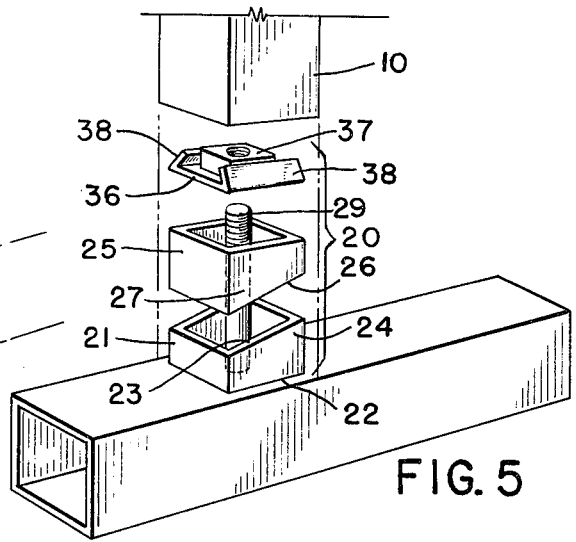
FIG. 5 is a perspective exploded view, somewhat enlarged, of FIG. 3 with the vertical tubular member shown in outline form only.

One embodiment of the fastening joint 20 is illustrated in exploded view in FIG. 5 positioned on the horizontal tubular member 12. A first displaceable member 21 formed of a square tubing section is provided with a flat base 22 and an inclined plane 23 which has an included angle 24 that is less than 90 degrees. The second or mating displaceable member 25 is positioned with its inclined plane 26 in spaced cooperative relationship and same inclination as the first displaceable member inclined plane 23 enabling them to cooperatively slide relative to each other as the members 21 and 25 have the same exterior dimensions. The included angle 27 of the second displaceable member 25 preferably has the same included angle as the included angle 24. It will be readily apparent that the included angles to form the inclined planes may vary considerably depending upon specific application and other factors including the type of materials used for the tubing and the displaceable members. The pair of displaceable members is supported on the threaded bolt 29 that extends upwardly through a tubular member 12 which has been suitably drilled to form the opening 30 for cooperatively receiving the spacer 31 which engages the inside of the wall 32 of the tube 12. The bolt 29 is provided with an Allen-head 33 which engages the shoulder 34 of the spacer 31.

The tubular member 12 is provided also with a bolt hole 35 drilled in alignment with the opening 30 but smaller in size. A flanged washer 36 cooperatively supports a threaded nut 37 through the inwardly inclined flanges 38 on the washer 36 which will prevent the nut from rotating when the entire assembly 20 is inserted into the tubular member 10.

Figure 3:
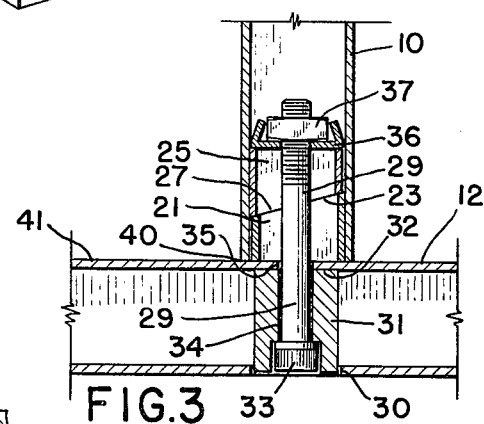
FIG. 3 is a transverse sectional view, reduced in size, of FIG. 1 incorporating one embodiment of the cooperating displaceable members for securing the tubular members together.

As shown in FIG. 3, the fastening joint is preassembled with the threaded nut 37 mounted on the bolt 29 enabling the washer 36 to move freely but not rotatably within the interior of the tubular member 10. The individual displaceable members 21 and 25 are also positioned in juxtaposition to each other and in aligned engagement along their inclined surfaces 23 and 27 permitting each displaceable member to slide relative to the other as the fastening joint is tightly secured by rotating the Allen-head 33 and preventing the nut 37 from rotating thereby drawing the individual components in the slidable and displaceable members more tightly together which will force the sides of each displaceable member against one or more walls of the interior of the tubular member 10.

In order to assure a tight connection between the tubular members 10 and 12, one need only make sure that the tube end 40 is contiguous with the exterior of the engaging wall 41 of the tubular member 12. In the event an angle connection is desirable, the necessary modifications may be made that would be obvious to one skilled in the art by mitering the end of the member 10 as well as the member 31 at both ends thereof in order to have a flush connection. Disassembly is readily achieved by loosening the Allen-head bolt 33 which will permit the displaceable members to disengage the frictional engagement with the interior wall of the tubular member 10 and the members may be separated readily.

Figure 6:
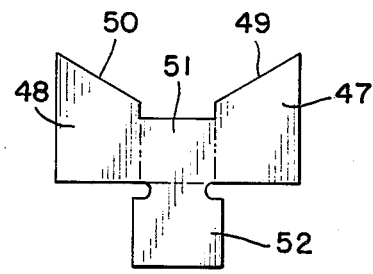
FIG. 6 is a plan view, somewhat reduced in size, of a preliminary stage of one of the two displaceable elements of FIG. 4.
Figure 4:
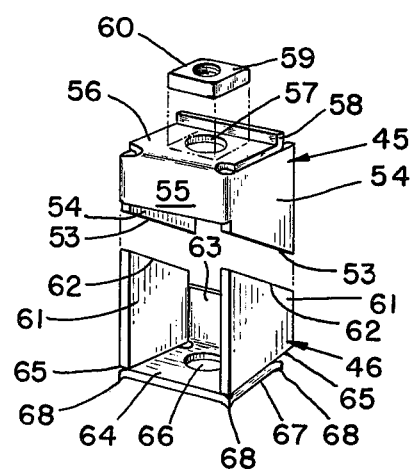
FIG. 4 is a modified version of a pair of cooperating displaceable members and a locking element shown in spaced relation with each of the displaceable members being formed of a stamping.

A second and preferred embodiment is shown in FIG. 4 in which the individual displaceable members 45 and 46 forming the pair of cooperating displaceable members may each be formed from flat stock by stamping in the flat stock the configuration shown in FIG. 6 in which the sides 47 and 48 are provided with an angle portion 49 and 50, respectively, that are ultimately the inclined surfaces of one or the other of the members 45 or 46 with the direction of the bending of the portions 47 and 48 being the same and the members positioned downwardly or upwardly with the corresponding positioning of the backing member 51. The flanking member 52 may form either the top or bottom of the cooperating displaceable member which will have to be provided with a suitable opening and flange.

As shown in FIG. 4, the upper displaceable member has the inclined edges 53 at the base of the side members 54 with the connecting member 55 therebetween. The abutting member 56 is bent 90° to abut the side portions 54 and is provided with a bolt opening 57. An upwardly turned lip or flange 58 is provided to engage one flat side 59 of the securing nut 60 to prevent rotation of the nut in the assembled position of the various joint fastening components.

The other cooperating displaceable member 46 is provided with upwardly extending walls 61 which have mating inclined faces 62 for cooperating with the inclined surfaces 53 of the member 45. The connecting web 63 to which the sides 61 are connected is also provided with a right angle bottom wall 64 which abuts the lower edges 65 of the connecting member 46. The bottom wall 64 is provided with a bolt receiving opening 66 and a saddle 67 on the bottom face with protruding edges or points 68 for engaging a tubular member and for preventing skewing or slipping. The assemblage of the joint fastening members of FIG. 4 would be substantially identical to that which is shown and described in FIGS. 3 and 5.

It is also contemplated that the displaceable members may be cast or molded depending upon the nature of the end fabrication of tubing to be used since the same concept of the slidable and displaceable members would be utilized to engage the interior surface of the tubing for frictionally retaining it in position against the mating tube or structural member.

It will be readily apparent that the washer 36 may be eliminated in the use of the embodiment shown in FIG. 4.

I claim:

1. A tube fastening joint comprising at least one tubular member and one structural member connected together at an angle to each other, a pair of displaceable members cooperatively insertable into said tubular member each having abutting inclined planes, said displaceable members being slidably displaceable relative to each other for locking engagement within said tubular member, and means extending through said structural member for releasably and cooperatively retaining said pair of displaceable members in said tubular member whereby the tubular and structural members are securely fastened together upon relative displacement of said displaceable members by said releasable retaining means.

2. A tube fastening joint as claimed in claim 1, and said tubular member having a square cross-sectional area.

3. A tube fastening joint as claimed in claim 1, said displaceable members having a cross-sectional area corresponding to that of the said tubular member.

4. A tube fastening joint as claimed in claim 1, said displaceable members having a square cross-sectional area.

5. A tube fastening joint as claimed in claim 1, said displaceable members having a square cross-sectional area with each member having cooperating inclined surfaces.

6. A tube fastening joint as claimed in claim 1, said releasably and cooperatively retaining means including a threaded bolt for receiving said displaceable members and a fastening means retained on said bolt for securing the displaceable members and displacing them relative to each other.

7. A tube fastening joint as claimed in claim 1, each of said displaceable members has a cross-section smaller than said tubular member in which said displaceable members are mounted, and said displaceable members having means for precluding rotation within said tubular member.

8. A tube fastening joint as claimed in claim 1, each of said displaceable members having inclined and opposed cooperating contact planes with one of the included angles in the plane being less than 90°.

9. A tube fastening joint as claimed in claim 1, said tubular member having a substantially square cross-sectional area, said displaceable members each having a substantially square cross-sectional area for slidable insertion into said tubular member of substantially square cross-sectional area, said releasable and cooperatively retaining means extending through said structural member into said tubular member and including means for urging said displaceable members together to contact and frictionally engage the tubular member in releasable locking relationship, one of said displaceable members having a tube-engaging and positioning means, and the other displaceable member having means for positioning said releasable and cooperating retaining means.

* * * * *